United States Patent
Randazzo et al.

(10) Patent No.: US 6,349,048 B2
(45) Date of Patent: Feb. 19, 2002

(54) VOLTAGE CONVERTER CIRCUIT HAVING A SELF-OSCILLATING HALF-BRIDGE STRUCTURE

(75) Inventors: Vincenzo Randazzo, Biancavilla; Natale Aiello, Trecastagni; Atanasio La Barbera, Mascalucia, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/747,171

(22) Filed: Dec. 21, 2000

(30) Foreign Application Priority Data

Dec. 24, 1999 (EP) .............................. 99830799

(51) Int. Cl.[7] .......................................... H02M 7/5387
(52) U.S. Cl. ...................................... 363/132; 363/133
(58) Field of Search .............................. 363/17, 22, 23, 363/13, 132, 133; 315/209 R, 307, 224, 291

(56) References Cited

U.S. PATENT DOCUMENTS

| | | | |
|---|---|---|---|
| 3,560,838 A | | 2/1971 | Weixelman .................. 321/16 |
| 4,035,745 A | | 7/1977 | Doetsch et al. ............. 331/114 |
| 4,504,779 A | | 3/1985 | Haman ....................... 323/349 |
| 4,520,255 A | | 5/1985 | Bredenkamp et al. ... 219/130.1 |
| 4,540,893 A | | 9/1985 | Bloomer ...................... 307/248 |
| 4,887,201 A | * | 12/1989 | Nilssen ....................... 363/132 |
| 4,947,063 A | | 8/1990 | O'Shaughnessy et al. .. 307/572 |
| 5,194,760 A | | 3/1993 | Braun et al. ................ 307/263 |
| 5,229,927 A | * | 7/1993 | Vila Masot et al. ......... 363/23 |
| 5,410,220 A | | 4/1995 | von Hertzen ........... 315/209 R |
| 5,723,953 A | * | 3/1998 | Nerone et al. .............. 315/307 |
| 5,864,211 A | * | 1/1999 | Kiermeir ..................... 315/127 |
| 6,021,055 A | * | 2/2000 | Parry .......................... 363/49 |
| 6,198,231 B1 | * | 3/2001 | Schemmel et al. ......... 315/225 |
| 6,274,988 B1 | * | 8/2001 | De Vries .................... 315/307 |
| 6,288,500 B1 | * | 9/2001 | Klier ...................... 315/209 R |

FOREIGN PATENT DOCUMENTS

| | | |
|---|---|---|
| DE | 4037348 | 2/1992 |
| EP | 0620644 | 6/1998 |
| GB | 2140996 | 12/1984 |
| GB | 2318467 | 4/1998 |
| JP | 4313077 | 11/1992 |
| PL | 173161 | 1/1998 |

* cited by examiner

Primary Examiner—Adolf Deneke Berhane
(74) Attorney, Agent, or Firm—Lisa K. Jorgenson; E. Russell Tarleton; SEED IP Law Group, PLLC

(57) ABSTRACT

A voltage converter circuit with a self-oscillating half-bridge configuration has a first and a second input terminal, and a first and a second output terminal, and including: a first power switch coupled between the first input terminal and the first output terminal, a second power switch coupled between the first output terminal and the second input terminal, a first voltage sensor having a first and a second sensing terminals coupled between the first input terminal and a control terminal of the first power switch, and a second voltage sensor having a first and a second sensing terminals coupled between the first output terminal and a control terminal of the second power switch. Each voltage sensor detects a voltage variation supplied on its respective first sensing terminal and generates on the respective second sensing terminal an activation potential for the respective power switch.

18 Claims, 3 Drawing Sheets

VOLTAGE CONVERTER CIRCUIT HAVING A SELF-OSCILLATING HALF-BRIDGE STRUCTURE

TECHNICAL FIELD

The present invention pertains to a voltage converter circuit having a self-oscillating half-bridge structure.

BACKGROUND OF THE INVENTION

As is known, in all applications that require conversion of a continuous voltage or a low frequency alternating voltage into an alternating voltage having a higher frequency, such as lighting applications, in which the 50 Hz main voltage is converted into a 30 to 50 kHz voltage to control fluorescent or halogen lamps, voltage converter circuits are used that generally have a self-oscillating half-bridge configuration.

According to a known solution, a voltage converter circuit 1 of the above indicated type is shown in FIG. 1 and comprises a first input terminal 2a and a second input terminal 2b (the second terminal 2b being connected to ground), between which an input voltage $V_{in}$ is supplied, and a first output terminal 3a and a second output terminal 3b, between which an output voltage $V_{out}$ is supplied. A capacitive divider 4 is connected between the input terminals 2a, 2b and comprises a first capacitor 5 having a capacitance $C_1$ and a second capacitor 6 having a capacitance $C_2$, the capacitors 5 and 6 being connected in series.

Connected between the input terminals 2a, 2b are also a first switch 7 and a second switch 8. In particular, the first switch 7 is connected between the first input terminal 2a and the first output terminal 3a, and the second switch 8 is connected between the first output terminal 3a and the second input terminal 2b.

Connected between the first output terminal 3a and the second output terminal 3b is a resonant load 10 comprising a lamp 12 connected in parallel to a capacitor 13 and connected in series to an induction coil 14.

The switches 7, 8 have a control terminal each, 17 and 18 respectively, which are connected to output terminals of an integrated circuit 15 which controls in phase opposition opening or closing of the switches 7, 8. In particular, when the integrated circuit 15 controls closing of the first switch 7 or opening of the second switch 8, the first output terminal 3a is connected to the first input terminal 2a; instead, when the integrated circuit 15 controls opening of the first switch 7 and closing of the second switch 8, the first output terminal 3a is connected to the second input terminal 2b. In this way, an output voltage $V_{out}$ is obtained alternating at a frequency determined by switching of the switches 7, 8 and controlled by the integrated circuit 15.

This known solution, however, has the drawback of being somewhat costly and complex.

In addition, with the above known solution it is possible to prevent the switches 7, 8 from conducting simultaneously and connecting the first input terminal 2a to the second input terminal 2b by inserting delay circuits which suitably delay turning on of the switches 7, 8. However, this entails greater circuit complexity, and hence higher costs.

Voltage converters are moreover known that use a transformer to generate or synchronize oscillations of the voltage supplied to the load. Also these converters are disadvantageous in that the transformer entails an increase in costs.

SUMMARY OF THE INVENTION

The technical problem addressed by the disclosed embodiment of the present invention is to overcome the limits and drawbacks referred to above.

According to the present invention, a voltage converter circuit is provided. The voltage converter circuit includes a self-oscillating half-bridge configuration with a first input terminal and a second input terminal receiving an input voltage, and a first output terminal and a second output terminal supplying an output voltage, and further including: a first power switch having a first conduction terminal and a second conduction terminal connected, respectively, to the first input terminal and to the first output terminal, and a control terminal; a second power switch having a first conduction terminal and a second conduction terminal connected, respectively, to the first output terminal and to the second input terminal, and a control terminal; a first voltage sensor element having a first sensing terminal connected to the first input terminal and a second sensing terminal connected to the control terminal of the first power switch and to the first output terminal, the first voltage sensor element detecting on the first sensing terminal a variation in a first preset direction of a voltage across the first input terminal and the first output terminal and a generating on the second sensing terminal a first activation potential for the first power switch; and a second voltage sensor element having a first sensing terminal connected to the first output terminal and a second sensing terminal connected to the control terminal of the second power switch and to the second input terminal, the second voltage sensor element detecting on the first sensing terminal a variation in a second preset direction of a voltage across the first output terminal and the second input terminal, and a generating on the second sensing terminal a second activation potential for the second power switch.

BRIEF DESCRIPTION OF THE DRAWINGS

The features and advantages of the circuit according to the invention will be clear from the following description of an embodiment, given simply as a non-limiting example, with reference to the attached drawings, wherein.

DETAILED DESCRIPTION OF THE INVENTION

Figure 1:
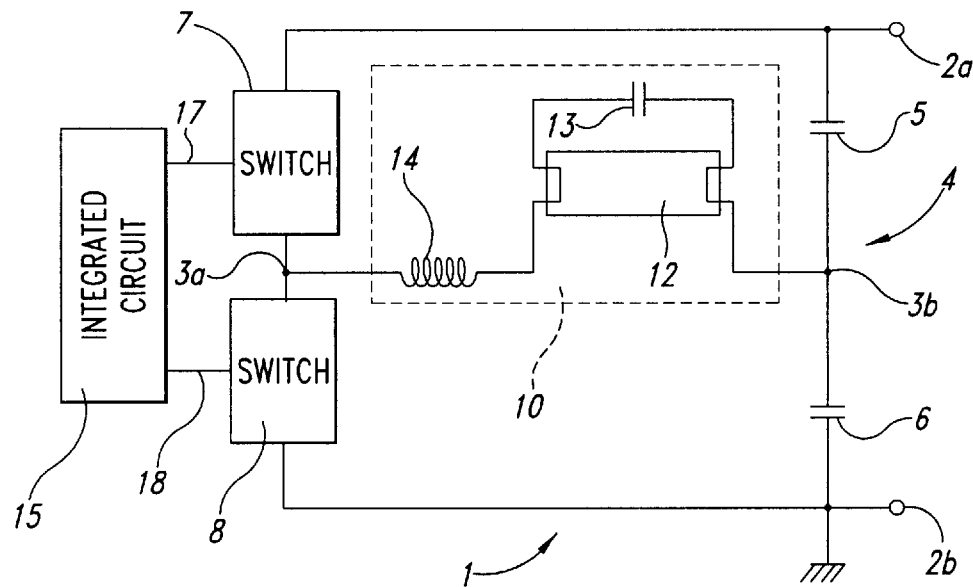
FIG. 1 is a simplified electrical diagram of a known voltage converter circuit.
Figure 2:
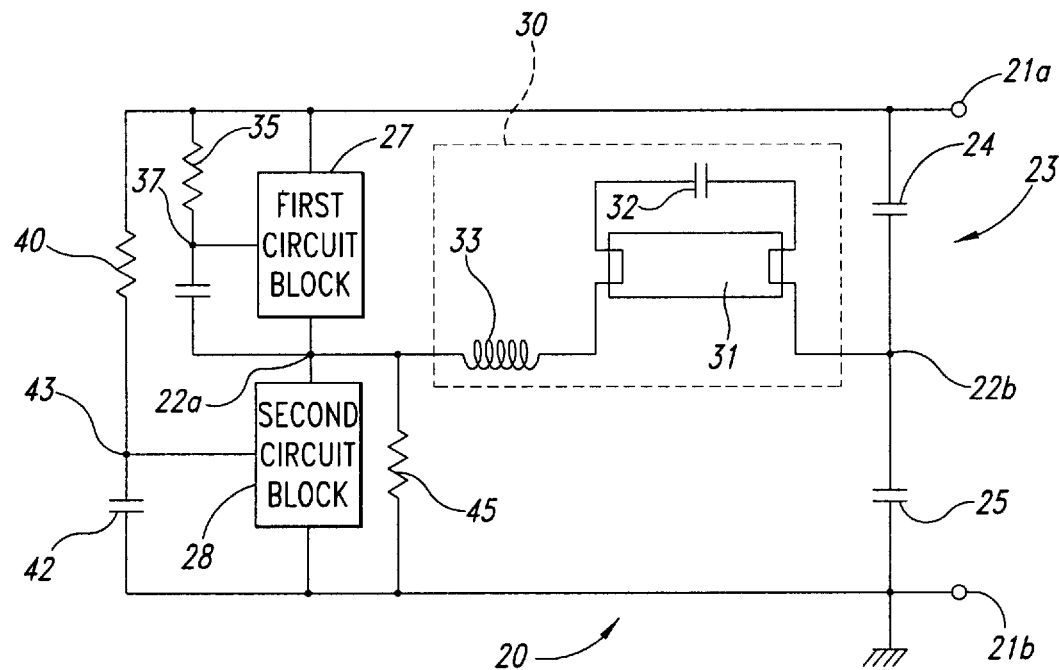
FIG. 2 is a simplified electrical diagram of a voltage converter circuit according to the invention.

FIG. 2 shows a voltage converter circuit 20 which has a self-oscillating half-bridge configuration and has a first input terminal 21a and a second input terminal 21b, between which an input voltage $V_{in}$ is applied, and a first output terminal 22a and a second output terminal 22b, between which an output voltage $V_{out}$ is present.

The input voltage $V_{in}$ is a continuous voltage or a low frequency alternating voltage generated by a rectified network, not shown in FIG. 2.

A capacitive divider 23 is connected between the first input terminal 21a and the second input terminal 21b, and includes a first capacitor 24 having a capacitance $C_4$, and a second capacitor 25 having a capacitance $C_3$ which has the same value as the capacitance $C_4$. The capacitors 24, 25 are connected in series. In particular, the first capacitor 24 is connected between the first input terminal 21a and the second output terminal 22b, and the second capacitor 25 is connected between the second output terminal 22b and the second input terminal 21b.

A first resistor 35 having a resistance $R_1$ and a third capacitor 36 having a capacitance $C_1$ are connected in series between the first input terminal 21a and the first output terminal 22a. In detail, the first resistor 35 is connected between the first input terminal 21a and a first intermediate node 37, and the third capacitor 36 is connected between the first intermediate node 37 and the first output terminal 22a.

A second resistor 40 having a resistance $R_2$ and a fourth capacitor 42 having a capacitance $C_2$ are connected in series between the first input terminal 21a and the second input terminal 21b. In particular, the second resistor 40 is connected between the first input terminal 21a and a second intermediate node 43, and the fourth capacitor 42 is connected between the second intermediate node 43 and the second input terminal 21b.

The voltage converter circuit 20 also comprises a first circuit block 27 and a second circuit block 28. In detail, the first circuit block 27 has a first terminal, a second terminal, and a third terminal connected, respectively, to the first input terminal 21a, to the first output terminal 22a, and to the first intermediate node 37; the second circuit block 28 has a first terminal, a second terminal, and a third terminal connected, respectively, to the first output terminal 22a, to the second input terminal 21b, and to the second intermediate node 43.

An electrical load 30 is connected between the first output terminal 22a and the second output terminal 22b and comprises, for example, a lamp 31 connected in parallel to a resonant capacitor 32 having a capacitance $C_R$, and in series to a resonant induction coil 33 having an inductance $L_R$.

A third resistor 45 having a resistance $R_3$ is connected between the first output terminal 22a and the second input terminal 21b.

Figure 3:
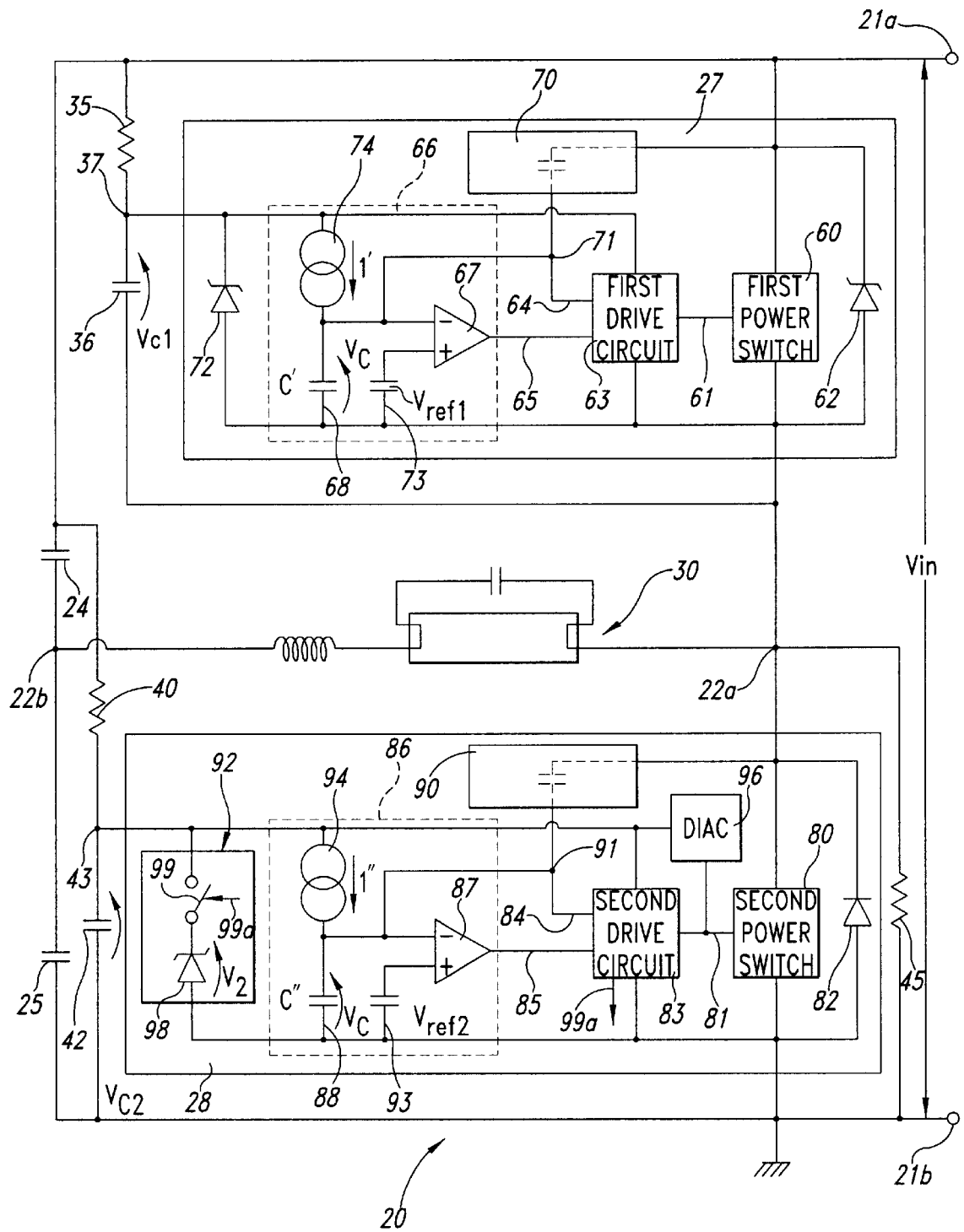
FIG. 3 shows a more detailed electrical diagram of the voltage converter circuit of FIG. 2.

As illustrated in greater detail in FIG. 3, the first circuit block 27 comprises a first power switch 60 (for example a power PMOS) having a first terminal and a second terminal connected, respectively, to the first input terminal 21a and to the first output terminal 22a, and a control terminal 61. A first freewheeling diode 62 is connected between the first terminal and the second terminal of the first power switch 60.

A first drive circuit 63, not shown in detail in FIG. 3 since known per se, is connected between the first intermediate node 37 and the first output terminal 22a, and has a first input terminal 64 and a second input terminal 65, and an output terminal connected to the control terminal 61 of the first power switch 60.

The first circuit block 27 also comprises a first oscillator circuit 66 including a first operational amplifier 67 which has an inverting input terminal and a non-inverting input terminal. The inverting input terminal is connected to the first output terminal 22a via a first synchronization capacitor 68 having a capacitance C'. The non-inverting input terminal is connected to the first output terminal 22a via a first voltage source 73 supplying a reference voltage $V_{ref1}$. The first operational amplifier 67 also has an output terminal connected to the second input terminal 65 of the first drive circuit 63. A first current source 74 supplying a reference current I' is connected between the first intermediate node 37 and the inverting input terminal of the first operational amplifier 67.

A first voltage sensor 70, for example a capacitor, is connected between the first input terminal 21a and a first circuit node 71. The first circuit node 71 is connected to the inverting input terminal of the first operational amplifier 67 and to the first input terminal 64 of the first drive circuit 63.

A Zener diode 72 has its cathode connected to the first intermediate node 37 and its anode connected to the first output terminal 22a.

The second circuit block 28 comprises a second power switch 80 having a first terminal connected to the first output terminal 22a, a second terminal connected to the second input terminal 21b, and a control terminal 81. A second freewheeling diode 82 is connected between the first terminal and the second terminal of the second power switch 80.

A second drive circuit 83, not shown in detail in FIG. 3 since known per se, is connected between the second intermediate node 43 and the second input terminal 21b, and has a first input terminal 84 and a second input terminal 85, and an output terminal connected to the control terminal 81 of the second power switch 80.

The second circuit block 28 also comprises a second oscillator circuit 86 including a second operational amplifier 87 which has an inverting input terminal and a non-inverting input terminal. The inverting input terminal is connected to the second input terminal 21b via a second synchronization capacitor 88 having a capacitance C". The non-inverting input terminal is connected to the second input terminal 21b via a second source generator 93 supplying a reference voltage $V_{ref2}$. The second operational amplifier 87 also has an output terminal connected to the second input terminal 85 of the second drive circuit 83. A second current source 94 supplying a reference current I" is connected between the second intermediate node 43 and the inverting input terminal of the second operational amplifier 87.

A second voltage sensor 90, for example a capacitor, is connected between the first output terminal 22a and a second circuit node 91. The second circuit node 91 is connected to the inverting input terminal of the second operational amplifier 87 and to the first input terminal 84 of the second drive circuit 83.

A dynamic voltage regulator 92 is connected between the second intermediate node 43 and the second input terminal 21b, and comprises, for instance, a Zener diode 98 having its anode connected to the second input terminal 21b and its cathode connected to the second intermediate node 43 via a switching element 99 which has a control terminal 99a connected to the second drive circuit 83. The second drive circuit 83 controls turning on of the switching element 99 in the turning off phase of the second power switch 80.

The second circuit block 28 further comprises a DIAC device 96 connected between the second intermediate node 43 and the control terminal 81 of the second power switch 80.

In a preferred embodiment of the voltage converter circuit 20, the values of the capacitances C' and C" are chosen so that they are equal to one another, as are the reference voltages $V_{ref1}$ and $V_{ref2}$, and the reference currents I' and I".

The operation of the voltage converter circuit is described hereinbelow.

Initially, the first power switch 60 and the second power switch 80 are off, and the input voltage $V_{in}$ and the output voltage $V_{out}$ are equal to a ground voltage (the voltage on the second input terminal 21b). When the input voltage $V_{in}$ is applied between the input terminals 21a and 21b (instant $t_0$), the first capacitor 24 and the second capacitor 25, which have equal capacitance, are charged, thereby the output voltage $V_{out}$ is brought to a value equal to $V_{in}/2$ (instant $t_1$).

In addition, the first resistor 35 and the third resistor 45 are flown by a current that charges the third capacitor 36 at a voltage $V_{C1}$, the maximum value of which is regulated via the Zener diode 72, and the second resistor 40 is flown by a current that charges the fourth capacitor 42 at a voltage $V_{C2}$.

The voltages $V_{C1}$ and $V_{C2}$ are, respectively, the supply voltages of the first circuit block 27 and of the second circuit block 28, supplied to the first intermediate node 37 and to the second intermediate node 43, respectively.

When the voltage $V_{C2}$ reaches the triggering value $V_{diac}$ for the DIAC device (instant $t_2$, FIG. 4), the second power switch 80 turns on, and current circulates through electrical load 30.

Advantageously, the first resistor 35, the second resistor 40, and the third resistor 45, as well as the third capacitor 36 and the fourth capacitor 42, are sized so that the charge time constant of the third capacitor 36 is lower than the charge time constant of the fourth capacitor 42. In this way, when the second power switch 80 turns on, the third capacitor 36 is already charged at the voltage $V_{C1}$.

Turning on of the second power switch 80 causes a negative variation of the output voltage $V_{out}$ and a consequent positive variation of voltage $V_{in}$-$V_{out}$.

These voltage variations are detected by the first voltage sensor 70 and the second voltage sensor 90, which confirm, respectively, the OFF state of the first power switch 60 and the ON state of the second power switch 80.

In greater detail, the second voltage sensor 90 translates the negative variation of the output voltage $V_{out}$ into a discharge current of the second synchronization capacitor 88. Thereby, the voltage $V_C$ across the second synchronization capacitor 88 rapidly reduces to zero, and the second operational amplifier 87, via the second drive circuit 83, confirms conduction of the second power switch 80. The output voltage $V_{out}$ then assumes a value equal to the ground voltage.

After the voltage $V_C$ across it has gone to zero, the second synchronization capacitor 88 starts again to get charged by the second current source 94. In this step, the fourth capacitor 42 is discharged to ground. When the value of the voltage $V_C$ on the second synchronization capacitor 88 equals the value of the reference voltage $V_{ref}$ (instant $t_3$, FIG. 4), the second operational amplifier 87 switches and, via the second drive circuit 83, turns off the second power switch 80.

Figure 4:
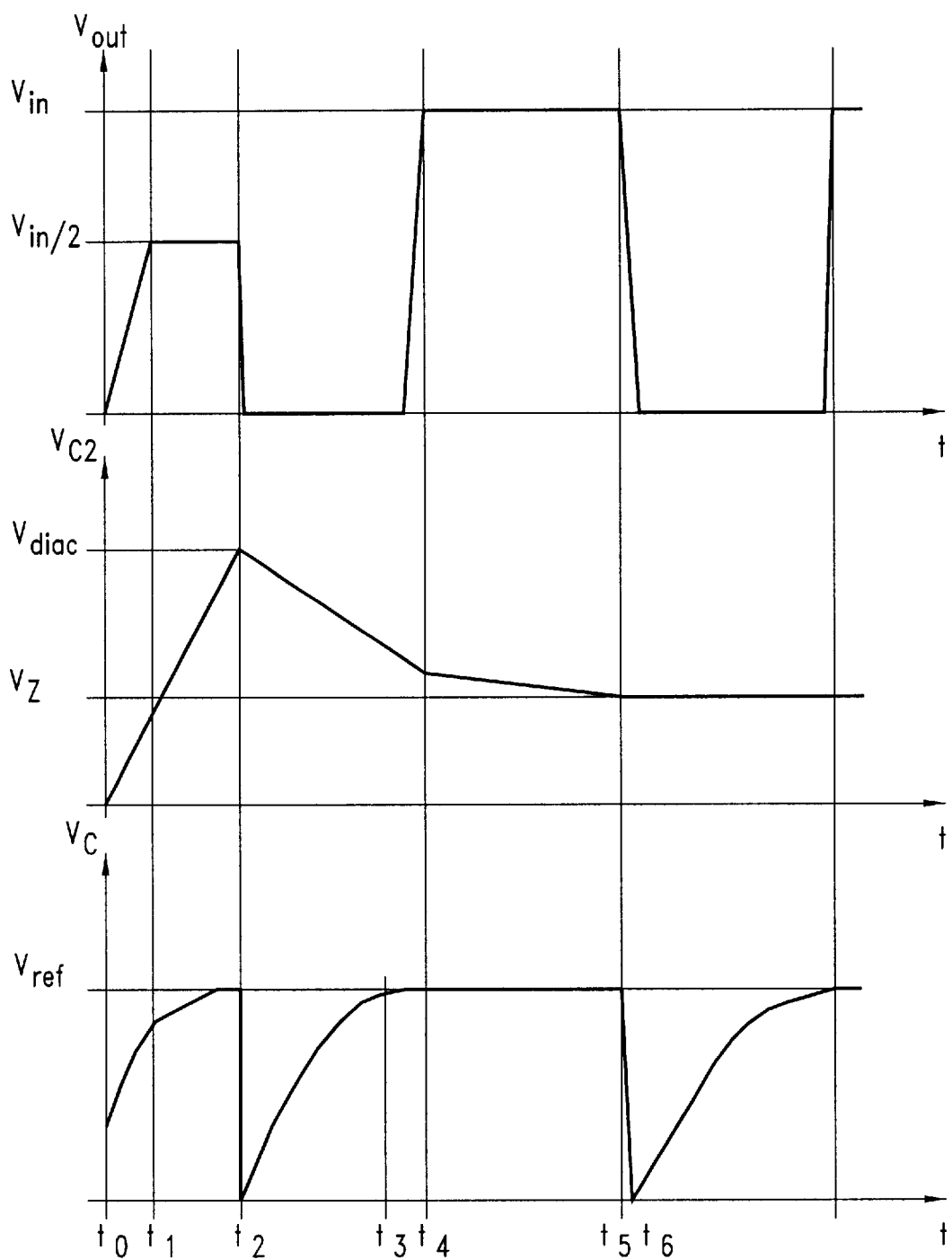
FIG. 4 shows the plots of electrical quantities measured on the circuit of FIG. 3.

Simultaneously with turning off of the second power switch 80, a command is sent for closing switching element 99; then the Zener diode 98 is connected in parallel to the fourth capacitor 42 and regulates the voltage $V_{C2}$ of the latter at its Zener voltage $V_Z$ (FIG. 4).

Turning off of the second power switch 80 causes a positive variation of the output voltage $V_{out}$, since current continues to pass through the electrical load 30, and causes a consequent negative variation of voltage $V_{in}$-$V_{out}$.

These voltage variations are detected by the first voltage sensor 70 and the second voltage sensor 90. The first voltage sensor 70 causes turning on of the first power switch 60, and the second voltage sensor 90 confirms the OFF state of the second power switch 80.

In particular, the first voltage sensor 70 translates the negative variation of voltage $V_{in}$-$V_{out}$ into a discharge current of the first synchronization capacitor 68, just as has been described above for the second synchronization capacitor 88. In this way, the voltage $V_C$ across the first synchronization capacitor 68 rapidly decreases to zero, and the first operational amplifier 67 switches, so enabling the first power switch 60 to conduct via the first drive circuit 63. The output voltage $V_{out}$ then assumes a value equal to that of the input voltage $V_{in}$ (instant $t_4$).

Also in this case, the ON state of the first power switch 60 persists until the voltage $V_C$ equals the reference voltage $V_{ref}$ (instant $t_5$); then the first operational amplifier 67 switches, and the first power switch 60 is turned off.

Turning off of the first power switch 60 causes a negative variation of the output voltage $V_{out}$. This negative variation is detected by the second voltage sensor 90, which discharges rapidly the second synchronization capacitor 88 and causes turning on of the second power switch (instant $t_6$). The cycle then proceeds as above described.

Subsequently, the voltage converter circuit 20 continues to oscillate between the two conditions just described, bringing the output voltage $V_{out}$ alternately to a value close to the input voltage $V_{in}$ on the first input terminal 21a and to a value close to that of the ground voltage, present on the second input terminal 21b. In this way, an output voltage $V_{out}$ is obtained having a square waveform with a preset frequency.

In practice, the first synchronization capacitor 68 and the first current source 74 define a first oscillating voltage source. The voltage $V_C$ across the first synchronization capacitor 68 is a first oscillating voltage having the waveform shown in FIG. 4. Likewise, the second synchronization capacitor 88 and the second current source 94 define a second oscillating voltage source. The voltage across the second synchronization capacitor 88 is a second oscillating voltage having a waveform similar to that of voltage $V_C$.

In particular, in the case considered above wherein both circuit blocks 27, 28 have same sizes, and thus have the same reference voltage values, equal current sources 74, 94, and equal synchronization capacitors 68, 88, the voltage converter circuit 20 conducts for the same period of time in the two conditions described above. If a duration other than 50% of the two half periods is desired, it is sufficient to differently size the capacitances of the synchronization capacitor 68, 88.

Advantageously, a delay element (not shown in FIG. 3) is present inside each drive circuit 63, 83 and is appropriately controlled by the corresponding voltage sensor 70, 90 to delay turning on of the corresponding power switch 60, 80. Thereby, turning on of the power switch 60, 80 is prevented when the voltage across it is still high.

The advantages of the voltage converter circuit 20 are the following. First, for a same performance, the voltage converter circuit according to the disclosed embodiment of the invention requires a smaller number of components and thus has lower manufacturing costs than the prior art circuit described previously.

In addition, the voltage converter circuit according to the invention prevents simultaneous conduction of the two power switches 60, 80 in any operating condition. In fact, the voltage converter circuit 20 enables conduction of each power switch 60, 80 only when the respective voltage sensor 70, 90 detects a negative variation of the voltage at the respective input terminal, as due to the turning off of the other power switch.

Finally, it is clear that numerous variations and modifications may be made to the voltage converter circuit described and illustrated herein, all falling within the scope of the invention, as defined in the attached claims and the equivalents thereof.

In particular, the voltage converter circuit according to the invention can be used for driving any type of load.

What is claimed is:

1. A voltage converter circuit, compromising:
a self-oscillating half-bridge configuration having a first input terminal and a second input terminal receiving an input voltage, and a first output terminal and a second output terminal supplying an output voltage, and further comprising:
   a first power switch having a first conduction terminal and a second conduction terminal connected, respectively, to said first input terminal and to said first output terminal, and a control terminal; and
   a second power switch having a first conduction terminal and a second conduction terminal connected, respectively, to said first output terminal and to said second input terminal, and a control terminal;
a first voltage sensor element having a first sensing terminal connected to said first input terminal and a second sensing terminal connected to said control terminal of said first power switch and to said first output terminal, said first voltage sensor element detecting on said first sensing terminal a variation in a first preset direction of a voltage across said first input terminal and said first output terminal and generating on said second sensing terminal a first activation potential for said first power switch; and
a second voltage sensor element having a first sensing terminal connected to said first output terminal and a second sensing terminal connected to said control terminal of said second power switch and to said second input terminal, said second voltage sensor element detecting on said first sensing terminal a variation in a second preset direction of a voltage across said first output terminal and said second input terminal, and generating on said second sensing terminal a second activation potential for said second power switch.

2. The voltage converter circuit of claim 1, wherein said variation in a first direction and said variation in a second variation comprise a voltage reduction.

3. The voltage converter circuit of claim 1, further comprising:
a first oscillator circuit coupled between said second sensing terminal of said first voltage sensor element and said first output terminal, and having an output terminal connected to said control terminal of said first power switch and generating a first enabling signal for said first power switch as long as the voltage on said second sensing terminal of said first voltage sensor element is lower than a first preset value; and
a second oscillator circuit coupled between said second sensing terminal of said second voltage sensor element and said second input terminal, and having an output terminal connected to said control terminal of said second power switch and generating a second enabling signal for said second power switch as long as the voltage on said second sensing terminal of said second voltage sensor element is lower than a second preset value.

4. The voltage converter circuit of claim 3, wherein:
said first oscillator circuit comprises a first operational amplifier having a first input terminal, a second input terminal, and an output terminal, and a first oscillating voltage source,
said first input terminal of said first operational amplifier connected to said second sensing terminal of said first voltage sensor element, said second input terminal of said second operational amplifier receiving a first reference voltage, and said output terminal of said first operational amplifier connected to said output terminal of said first oscillator circuit,
said first oscillating voltage source coupled between said second sensing terminal of said first voltage sensor element and said first output terminal, and generating a first oscillating voltage increasing between a first value and a second value in the absence of said first activation potential and switching from said second value to said first value upon receiving said first activation potential; and
said second oscillator circuit comprises a second operational amplifier having a first input terminal and a second input terminal, and an output terminal, and a second oscillating voltage source,
said first input terminal of said second operational amplifier connected to said second sensing terminal of said second voltage sensor element, said second input terminal of said second operational amplifier receiving a second reference voltage, and said output terminal of said second operational amplifier connected to said output terminal of said second oscillator circuit,
said second oscillating voltage source coupled between said second sensing terminal of said second voltage sensor element and said second input terminal, and generating a second oscillating voltage increasing between a third value and a fourth value in the absence of said second activation potential and switching from said fourth value to said third value upon receiving said second activation potential.

5. The voltage converter circuit of claim 4, wherein:
said first oscillating voltage source comprises a first supply input receiving a first supply voltage; a first current source connected between said first supply input and said second sensing terminal of said first voltage sensor element; a first capacitive element coupled between said second sensing terminal of said first voltage sensor element and said first output terminal; and
said second oscillating voltage source comprises a second supply input receiving a second supply voltage; a second current source connected between said second supply input and said second sensing terminal of said second voltage sensor element; and a second capacitive element coupled between said second sensing terminal of said second voltage sensor element and said second input terminal.

6. The voltage converter circuit of claim 5, further comprising:
a static voltage regulator connected between said first supply input and said first output terminal; and
a dynamic voltage regulator connected between said second supply input and said second input terminal.

7. The voltage converter circuit of claim 5, further comprising: a first and a second resistive element, and a third and a fourth capacitive element,
said first resistive element connected between said first input terminal and said first supply input,
said third capacitive element connected between said first supply input and said first output terminal,
said second resistive element connected between said first input terminal and said second supply input, and
said fourth capacitive element connected between said second supply input and said second input terminal.

8. The voltage converter circuit of claim 1, wherein said first voltage sensor element and second voltage sensor element comprise a respective capacitive element.

9. The voltage converter circuit of claim 1, further comprising a capacitive divider connected between said first input terminal and said second input terminal and having an intermediate node connected to said second output terminal.

10. The voltage converter circuit of claim 3, further comprising: a first drive circuit connected between said output terminal of said first oscillator circuit and said control terminal of said first power switch, and a second drive circuit connected between said output terminal of said second oscillator circuit and said control terminal of said second power switch.

11. A voltage converter circuit, comprising:
a first input terminal, a second input terminal, and a first output terminal;
a first power switch circuit having a first terminal coupled to the first input terminal, a second terminal coupled to the first output terminal, and a third terminal, the first power switch configured to alternatingly couple and uncouple the first input terminal to the first output terminal when a voltage variation in a first preset direction of a voltage across the first input terminal is sensed by the first power switch circuit;
a second power switch circuit having a first terminal coupled to the second input terminal, a second terminal coupled to the first output terminal, and a third terminal, the second power switch configured to alternatingly couple and uncouple the second input terminal to the first output terminal when a variation in a second preset direction of a voltage across the first input terminal is sensed by the second power switch;
a first resistive element connected between the first input terminal and the third terminal of the first power switch;
a first capacitive element connected between the third terminal and the first output terminal;
a second resistive element coupled between the first input terminal and the third terminal of the second power switch; and
a second capacitive element connected between the second input terminal and the third terminal of the second power switch.

12. The circuit of claim 11, wherein the first power switch circuit comprises a first power switch having a first conduction terminal and a second conduction terminal connected, respectively, to the first input terminal and to the first output terminal, and a control terminal; and a first a first voltage sensor element having a first sensing terminal connected to the first input terminal and a second sensing terminal connected to the control terminal of the first power switch and to the first output terminal, the first voltage sensor element configured to detect on the first sensing terminal a variation in a first present direction of the voltage across the first input terminal and the first output terminal and to generate on the second sensing terminal a first activation potential for the first power switch;
the second power switch circuit comprising a second power switch having a first conduction terminal and a second conduction terminal connected, respectively, to the first output terminal and to the second input terminal, and a control terminal; and a second voltage sensor element having a first sensing terminal connected to the first output terminal and a second sensing terminal connected to the control terminal of the power switch and to the second input terminal, the second voltage sensor element configured to detect on the first sensing terminal a variation in a second preset direction of the voltage across the first output terminal and the second input terminal, and to generate on the second sensing terminal a second activation potential for the second power switch.

13. The circuit of claim 11, wherein the first voltage sensor element and the second voltage sensor element comprise a respective capacitive element.

14. A voltage converter circuit, compromising:
a self-oscillating half-bridge configuration having a first input terminal and a second input terminal receiving an input voltage, and a first output terminal and a second output terminal supplying an output voltage, and further comprising:
a first power switch having a first conduction terminal and a second conduction terminal connected, respectively, to said first input terminal and to said first output terminal, and a control terminal; and
a second power switch having a first conduction terminal and a second conduction terminal connected, respectively, to said first output terminal and to said second input terminal, and a control terminal;
a first voltage sensor element having a first sensing terminal connected to said first input terminal and a second sensing terminal connected to said control terminal of said first power switch and to said first output terminal, said first voltage sensor element detecting on said first sensing terminal a variation in a first preset direction of a voltage across said first input terminal and said first output terminal and generating on said second sensing terminal a first activation potential for said first power switch;
a second voltage sensor element having a first sensing terminal connected to said first output terminal and a second sensing terminal connected to said control terminal of said second power switch and to said second input terminal, said second voltage sensor element detecting on said first sensing terminal a variation in a second preset direction of a voltage across said first output terminal and said second input terminal, and generating on said second sensing terminal a second activation potential for said second power switch; and
a resonant load having a first terminal coupled to the first output terminal and a second terminal coupled to the second output terminal.

15. A voltage converter circuit, comprising:
first and second input terminals coupled to respective first and second voltage sources;
first and second output terminals;
a first power switch circuit comprising a first power switch having a first conduction terminal and a second conduction terminal connected, respectively, to the first input terminal and to the first output terminal, and a control terminal; a first voltage sensor element having a first sensing terminal connected to the first input terminal and a second sensing terminal connected to the control terminal of the first power switch and of the first output terminal, the first voltage sensor element detecting on the first sensing terminal a variation in a first preset direction of a voltage across the first input terminal and the first output terminal, and generating on the second sensing terminal a first activation potential for the first power switch; and a first oscillator circuit coupled between the second sensing terminal of the first voltage sensor element and the first output terminal, and having an output terminal connected to the control terminal of the first power switch and generating a first enabling signal for the first power switch as long as the voltage on the second sensing terminal of the first voltage sensor element is lower than a first preset value; and a second power switch circuit comprising a second power switch having a first conduction terminal and a second conduction terminal connected, respectively, to the first output terminal and to the second input terminal, and a control terminal; a second voltage sensor element having a first sensing terminal connected to the first output terminal and a second sensing terminal connected to the control terminal of the second power switch and to the second input terminal, the second voltage sensor element detecting on the first sensing terminal a variation in a second preset direction of a voltage across the first output terminal and the second input terminal, and generating on the second sensing terminal a second activation potential for the second power switch; and a second oscillator circuit coupled between the second sensing terminal of the second voltage sensor element and the second input terminal, and having an output terminal connected to the control terminal of the second power switch and generating a second enabling signal for the second power switch as long as the voltage on the second sensing terminal of the second voltage sensor element is lower than a second preset value.

16. The circuit of claim 15, further comprising a resonant load having a first terminal coupled to the first output terminal and a second terminal coupled to the second output terminal.

17. The circuit of claim 15, further comprising a static voltage regulator coupled between the first output terminal and a first supply input terminal to the first oscillator circuit; and a dynamic voltage regulator having a first terminal coupled to a second supply input terminal to the second oscillator and a second terminal coupled to the second input terminal.

18. The circuit of claim 15, further comprising a first resistive element coupled between the first input terminal and the first supply input to the first oscillator circuit;

a first capacitive element connected between the first supply input to the first oscillator circuit and the first output terminal;

a second resistive element connected between the first input terminal and the second supply input to the second oscillator circuit; and a second capacitive element connected between the second supply input to the second oscillator circuit and the second input terminal.

* * * * *